United States Patent [19]
Rahman

[11] Patent Number: 5,990,664
[45] Date of Patent: Nov. 23, 1999

[54] PROCESS AND APPARATUS FOR MODULATING TERMINAL VOLTAGE OF BATTERY

[75] Inventor: Syed Rahman, Gainesville, Fla.

[73] Assignee: Eveready Battery Company, Inc., St. Louis, Mo.

[21] Appl. No.: 09/050,310

[22] Filed: Mar. 30, 1998

[51] Int. Cl.⁶ ...................................... H02J 7/00
[52] U.S. Cl. ........................... 320/136; 320/135; 324/426
[58] Field of Search ..................................... 320/135, 136, 320/134, 127; 324/426, 433; 340/636; 429/60

[56] References Cited

U.S. PATENT DOCUMENTS

| | | |
|---|---|---|
| 5,563,495 | 10/1996 | Tomiyori et al. . |
| 5,596,260 | 1/1997 | Moravec et al. ......................... 320/135 |
| 5,617,324 | 4/1997 | Arai . |
| 5,672,951 | 9/1997 | Shiota . |
| 5,672,973 | 9/1997 | Arai et al. . |
| 5,691,078 | 11/1997 | Kozaki et al. . |
| 5,696,437 | 12/1997 | Panther et al. . |
| 5,698,962 | 12/1997 | Sakai et al. . |
| 5,705,929 | 1/1998 | Caravello et al. . |
| 5,708,347 | 1/1998 | Palanisamy et al. . |
| 5,715,465 | 2/1998 | Savage et al. . |
| 5,744,963 | 4/1998 | Arai et al. . |
| 5,838,139 | 11/1998 | Greene .................................... 320/136 |

*Primary Examiner*—Peter S. Wong
*Assistant Examiner*—K. Shin
*Attorney, Agent, or Firm*—Linda Gebauer; Robert W. Welsh

[57] ABSTRACT

The present invention provides a method and apparatus for converting the terminal voltage of a battery so that one or more operations (such as shut-down, save-to-disk, and the like) begin at the appropriate point on the discharge curve for various cell chemistries. A control circuit is provided for triggering end-of-discharge operations based on various predetermined points, such as remaining capacity, voltage, temperature, and safety for devices which utilize a predetermined terminal voltage measurement to trigger one or more operations. The control circuit modulates the terminal voltage of the battery to a value which substantially matches the predetermined terminal voltage threshold of the device upon reaching a predetermined point, thereby successfully triggering operations at the appropriate time. The control circuitry also can modulate the terminal voltage to maintain it above the threshold to delay triggering of one or more operations. The method and apparatus of the present invention provides a solution in the electronic circuitry of the battery to allow devices designed for use with cells of a certain chemistry be able to suspend operations without losing data or delay operations to avoid wasting battery capacity when used with cell chemistries different than those for which the devices were designed.

25 Claims, 4 Drawing Sheets

PROCESS AND APPARATUS FOR MODULATING TERMINAL VOLTAGE OF BATTERY

FIELD OF THE INVENTION

This invention relates to rechargeable batteries and more specifically to a method and apparatus for modulating the terminal voltage of a battery at certain points during discharge to account for inconsistencies in cell chemistry which result in different discharge curves.

BACKGROUND OF THE INVENTION

In the past, batteries (also known as "dumb" cells) provided an unpredictable source of power, since typically, a user of a device powered by a battery had no reliable advance warning that a battery was about to run out of operable capacity. There was no indication of how much time was left so that a user could, for example, save the data currently being worked on or locate an alternate power source prior to complete discharge of the battery. As a result, a number of electronic products have been specifically designed to use the product's circuitry in an attempt to evaluate the battery's state of charge to determine when to begin back-up operations prior to the battery running out of capacity. This is done, for example, by measuring the terminal voltage of the battery, and, upon reaching a certain lower voltage limit, executing certain end-of-discharge operations, such as providing any necessary alarms or executing save-to-disk ("STD") operations.

This lower voltage limit is generally referred to as the end-of-discharge voltage (EODV) and is typically a constant, set according to the remaining capacity necessary for such end-of-discharge operations and the requirements for safe, efficient use of a cell. However, the discharge profile varies according to cell chemistry. Therefore, if a product's circuitry is designed to begin EODV save-to-disk operations at a set voltage for a certain type of cell, and a different cell with a different discharge curve is utilized to power the product, the EODV save-to-disk operations may be executed too soon resulting in a waste of capacity or, worse yet, too late resulting in loss of data.

An example of two cell chemistries which have different discharge curves are graphite based lithium-ion cells and coke-based lithium-ion cells. A typical graphite based lithium-ion cell can have a discharge profile as sown in FIG. 1. Various cell chemistries have certain lower limits for which they may be safely discharged to without adversely affecting the battery performance. For example, graphite based lithium-ion cells should not be discharged below 2.7 v. Coke-based lithium-ion cells, on the other hand, may be safely discharged to 2.5 v without adversely affecting performance. A typical coke-based lithium-ion cell can have a discharge profile as shown in FIG. 2. The discharge profile for coke-based lithium-ion cells gradually drops (FIG. 2), while the discharge profile for graphite based lithium-ion cells drops rapidly at the end of capacity (FIG. 1). Accordingly, the voltage near the end of capacity in graphite based lithium-ion cells is considerably higher than the coke-based lithium-ion cells. Therefore, if a product's circuitry is designed to begin EODV save-to-disk operations at a set voltage, e.g., 3.0 v for a coke-based lithium-ion cell (which would leave approximately 150 mAh capacity), and a graphite based lithium-ion cell is substituted therefor, when the terminal voltage reaches the preset voltage of 3.0 v, there is not enough capacity (e.g., only 40 mAh) remaining in the battery for such EODV save-to-disk operations and data may be lost. The same problems associated with the coke-based lithium-ion cells and graphite-based lithium ion cells may be recognized in other cell chemistries (e.g., Li-polymer, NiMH, and the like)

Accordingly, there is a need in the art to provide a way to allow a product, which utilizes terminal voltage measurements to trigger EODV operations, to begin such necessary EODV operations at the appropriate point in the discharge curve regardless of the actual terminal voltage.

BRIEF SUMMARY OF THE INVENTION

The present invention generally provides a method and apparatus for modulating voltage of a battery at its terminals so that one or more operations can be initiated at the appropriate point on the discharge curve for various cell chemistries. The voltage may be modulated to a higher or lower voltage at the terminals depending on the cell chemistry and the operating circumstances. The term battery as used herein represents any form of rechargeable cell which converts chemical energy into electric energy, including a single cell, a combination of cells connected in series or parallel, or a cell or cells assembled in a pack.

In a preferred embodiment, the present invention provides a method and apparatus for controlling the triggering of one or more operations in a device (e.g., portable computer, cellular phone, or the like) which utilizes a battery terminal voltage measurement for triggering the operations at a certain threshold(s), by converting the terminal voltage to a value(s) upon reaching a certain point(s). These points include, for example, points based on measurements such as battery voltage, cell voltage, remaining battery capacity, current, time, temperature, pressure, pH, and safety. The remaining capacity measurement is approximately a minimum value for remaining capacity required for completing end-of-discharge operations. The various operations include, for example, end-of-discharge operations, shut down operations, safety operations, save-to-disk operations, peripheral disabling operations, access disabling operations, sleep mode operations, low power mode operations, and alarm operations.

In a preferred embodiment, the terminal voltage is converted by discharge control circuitry within the circuitry of the battery. The discharge control circuitry activates voltage modulating circuitry to lower or raise the terminal voltage. Specifically, the discharge control circuitry activates the voltage modulating circuitry to lower the terminal voltage to one or more predetermined values which substantially match one or more of the predetermined thresholds to trigger one or more operations. This voltage modulating circuitry includes a switch or a buck converter, or the like. Alternatively, the discharge control circuitry activates the voltage modulating circuitry to maintain the terminal voltage at one or more predetermined values above one or more of the predetermined thresholds to delay triggering of one or more operations. This alternative voltage modulating circuitry includes a boost converter/regulator, dc-to-dc regulator, or the like.

DETAILED DISCLOSURE OF THE INVENTION

Many products and electronic devices, such a portable computers, cellular phones, and the like, determine when to begin various operations based on the measured terminal voltage of a battery. Such devices were generally not designed to communicate with the so-called "Smart Batteries" which provide necessary information to the device through bus communication. Therefore, in these devices, once the measured terminal voltage reaches a certain predetermined point (such as 3.0 v), operations such as "save-to-disk" begin to prevent loss of data. This predetermined point is typically a constant value designed into the device itself. Oftentimes, the designers of the device base this value on the minimum capacity (for a certain cell chemistry) necessary to perform certain operations prior to shut down. The present invention provides a method and apparatus for converting the terminal voltage of a battery so that certain operations begin at the appropriate point on the discharge curve for various cell chemistries, even if the device's thresholds were based on a single cell chemistry.

Figure 1:
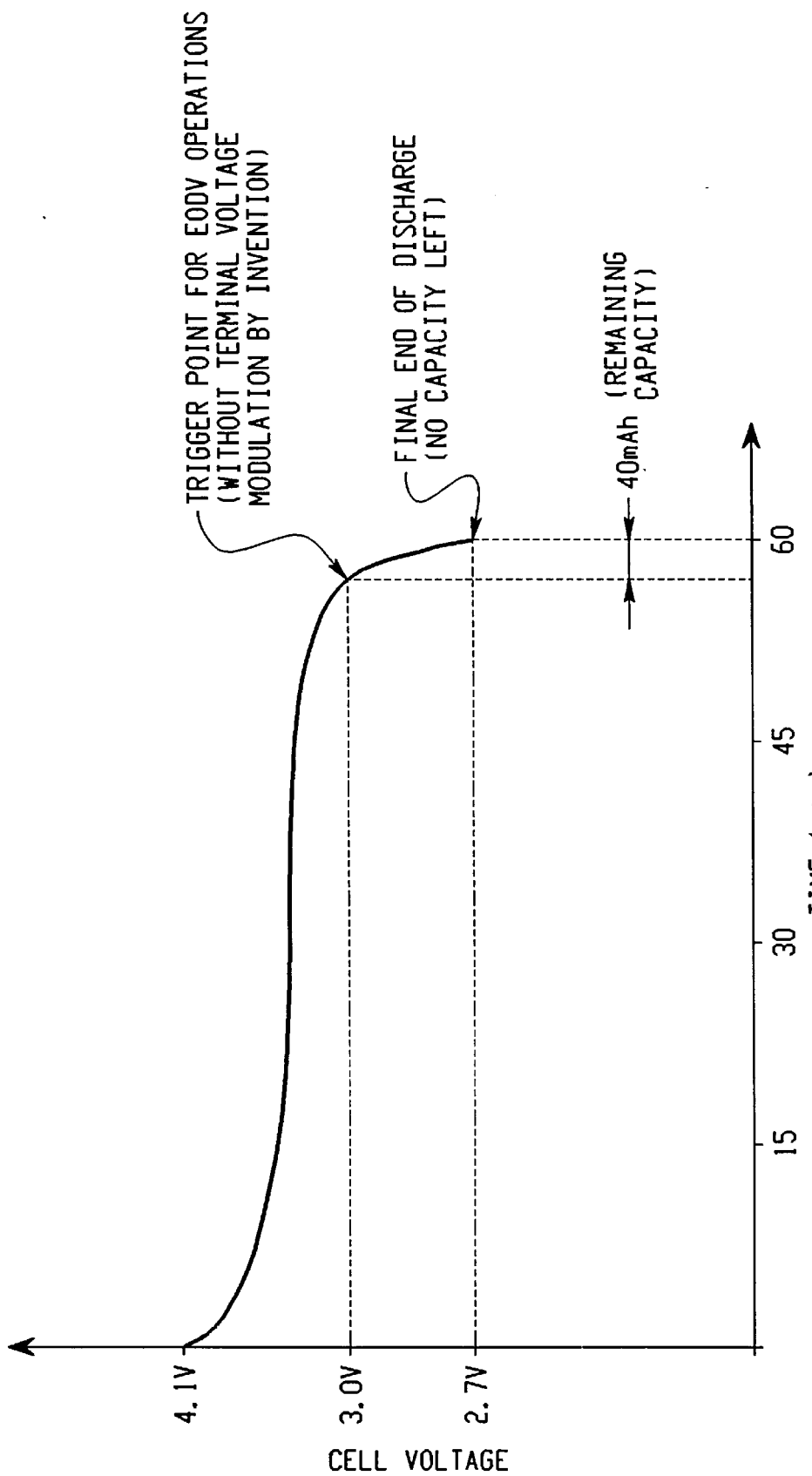
FIG. 1 is a graph showing the discharge curve of a typical graphite based lithium-ion cell having a cell capacity of 1350 mAh and a cell discharge rate of 1.35A.
Figure 2:
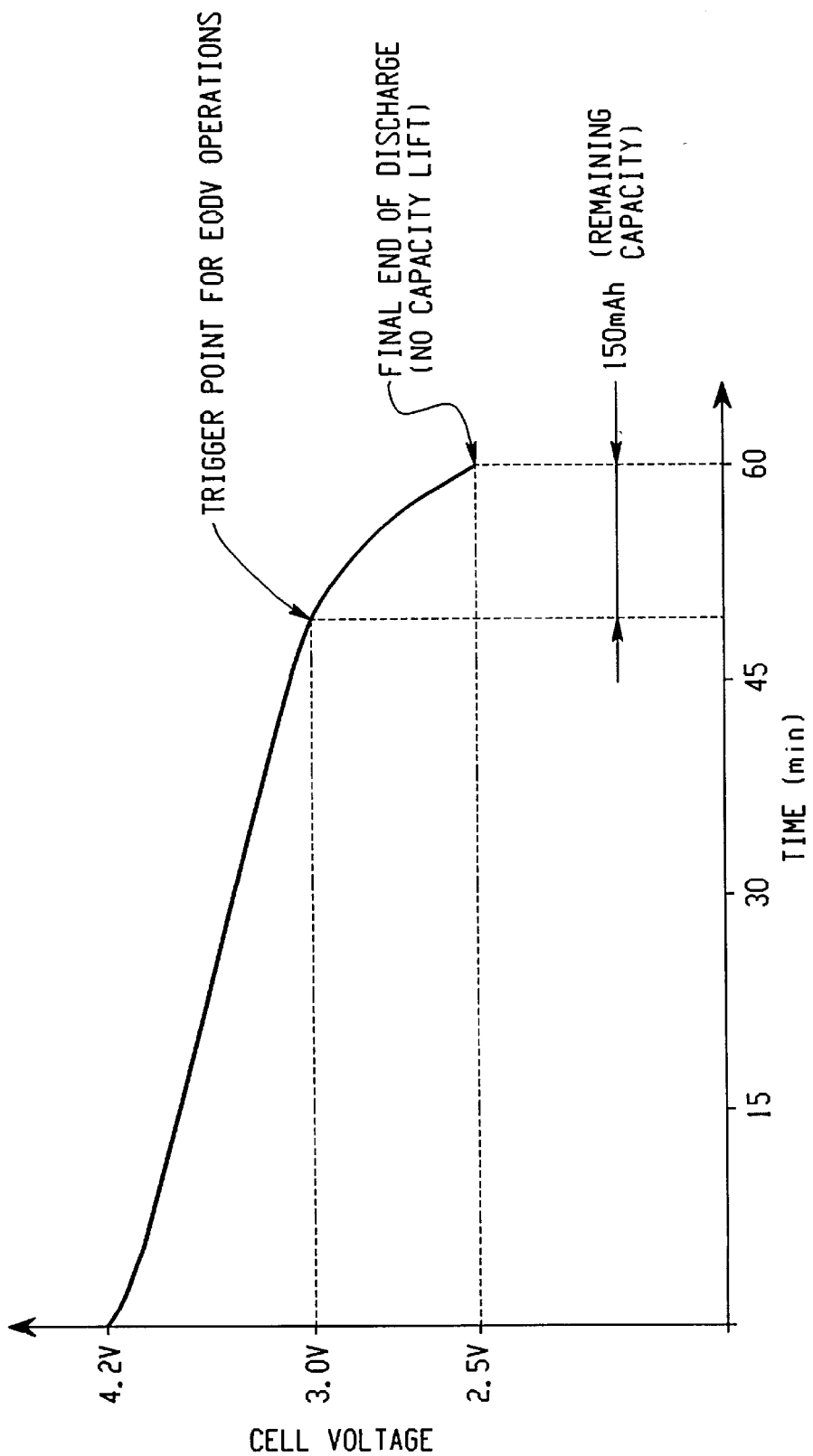
FIG. 2 is a graph showing the discharge curve of a typical coke-based lithium-ion cell having a cell capacity of 1300 mAh and a cell discharge rate of 1.3A.

FIG. 1 is a graph showing the discharge curve of a typical graphite based lithium-ion cell having a cell capacity of 1350 mAh and a cell discharge rate of 1.35A. FIG. 2 is a graph showing the discharge curve of a typical coke-based lithium-ion cell having a cell capacity of 1300 mAh and a cell discharge rate of 1.3A. As can be seen from these graphs, the different cell chemistries provide different discharge curves. Specifically, where a coke-based lithium-ion cell has approximately 150 mAh capacity remaining at a cell voltage of 3.0 v (which is sufficient to complete end of discharge operations, such as "save-to-disk"), the graphite based lithium-ion cell has approximately 40 mAh capacity remaining at a cell voltage of 3.0 v (which is not sufficient to complete end of discharge operations, such as "save-to-disk"). However, if the end of discharge operations began at a cell voltage of, for example, 3.2 v, there would be sufficient capacity (approximately 150 mAh) to complete such operations. Unfortunately, devices which measure terminal voltage and begin certain operations at a predetermined threshold(s) are not designed to change this constant threshold(s) when battery chemistries change. The present invention solves this problem by modulating the terminal voltage to trigger the operations at the appropriate time despite the cell chemistry in the battery. These operations begin early enough so that there is enough capacity remaining to complete the operations, or begin far enough down the discharge curve to avoid a waste of remaining capacity, depending on the cell chemistry and the operating conditions. Other cell chemistries also have differing discharge curves (such a Li-polymer and NiMH), and the present invention would be readily applicable in such other situations.

Figure 3A:
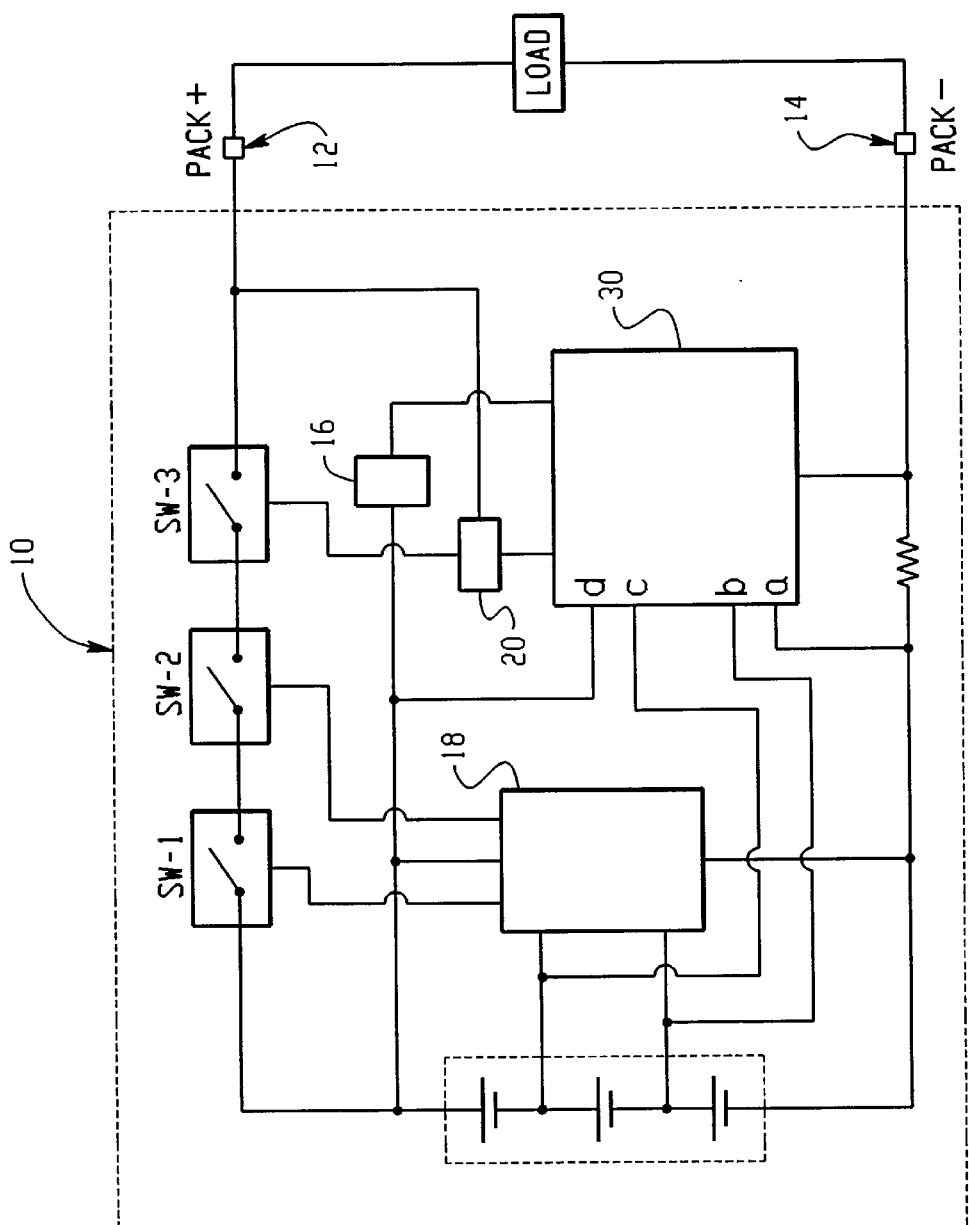
FIG. 3a is a circuit diagram of the discharge control circuitry which modulates the terminal voltage at a certain point(s) to a predetermined value(s).

Turning now to FIG. 3a, the preferred circuitry for modulating the terminal voltage in a lithium-ion battery is illustrated. A typical battery 10 (three cells in series) having positive and negative terminals, 12, 14 from which voltage may be measured by a device is shown. The invention may be utilized with any cell or combination of cells and is not limited to that shown herein. Typically, the device (not shown) measures the terminal voltage at the battery terminals 12, 14 to determine if the terminal voltage has reached a predetermined value to begin operations, such as "EODV save-to-disk" operations. The present invention includes circuitry that allows the terminal voltage to be converted to a lower or higher (FIG. 3b) value at an appropriate point so that the device which measures the terminal voltage is "deceived" into beginning operations (or delaying operations) at this "false" voltage shown on the terminals.

Specifically, as shown in FIG. 3a, attached to one of the terminals (e.g., positive terminal 12) is discharge control circuitry 20. The discharge control circuitry 20 is controlled by a microcontroller 30 or other suitable control logic. A voltage regulator 16 is attached to the microcontroller 30. The voltage regulator 16 powers the microcontroller and acts as a voltage reference for the discharge control circuitry 20. Other voltage reference devices may be utilized herein as known in the art. Protection circuits 18 and protection switches, SW-1 and SW-2 may also be included. The microcontroller 30 has voltage sensing points a, b, c, d as shown. The microcontroller 30 can measure the voltage at each cell to activate the control circuitry 20 if any of the cell voltages reach a control trigger capacity point. Alternatively, the microcontroller 30 can measure the voltage across the series of cells to determine when to activate the control circuitry 20. The microcontroller 30 can also utilize any other measurements, such as remaining battery capacity, current, time, temperature, pressure, pH, and safety to activate the control circuitry 20. For example, if a temperature sensor (or other safety monitor) determines at any time that an unsafe condition exists, the microcontroller 30 can activate the control circuitry 20 to lower the terminal voltage. The device reads this low terminal voltage and, believing the battery to be at its end of capacity, triggers a "shut down" of the device. In this manner, effectively, the present invention forces a shut down of the device for safety reasons, even if the device was never designed to have such safety shut down features.

In operations, the discharge control circuitry 20 converts the terminal voltage in a preferred embodiment by controlling a switch SW-3, such as a MOSFET. However, the present invention envisions any type of circuitry to accomplish the desired decrease in voltage at the terminals of the battery, such as regulators, including switch type, series type, shunt type, buck converters, and the like. When a device measures the terminal voltage after the discharge control circuitry 20 is activated, the voltage represented at the terminals is actually lower than the actual voltage of the battery. In normal operation, the discharge control switch (SW-3) is ON. When discharging, if the microcontroller 30 determines that an operation needs to be triggered, such as when the capacity of the battery begins to reach the point where EODV operations should begin, the microcontroller 30 activates the discharge control circuitry 20 which activates the switch SW-3 to regulate the terminal voltage to a desired threshold voltage of, for example, 8 v, even if the battery voltage is above 8 v.

In an alternate embodiment, if a device has more than one threshold voltage to trigger various operations, the circuitry 20 can convert the terminal voltage to each of those thresholds at the appropriate point in time/capacity.

A specific application of this invention is when a graphite-based lithium-ion battery, is used to mimic a coke-based lithium ion battery so that the device begins its EODV operations with enough capacity remaining to perform such operations. The circuitry is preferably included in the battery's circuitry (i.e., within the battery pack), so that devices need not be modified in order to take advantage of the present invention. The devices can continue to utilize terminal voltage measurements to initiate operations, but the circuitry of the present invention modifies the terminal voltage on the battery appropriately so that operations begin at the appropriate point on the discharge curve despite battery chemistry.

Figure 3B:
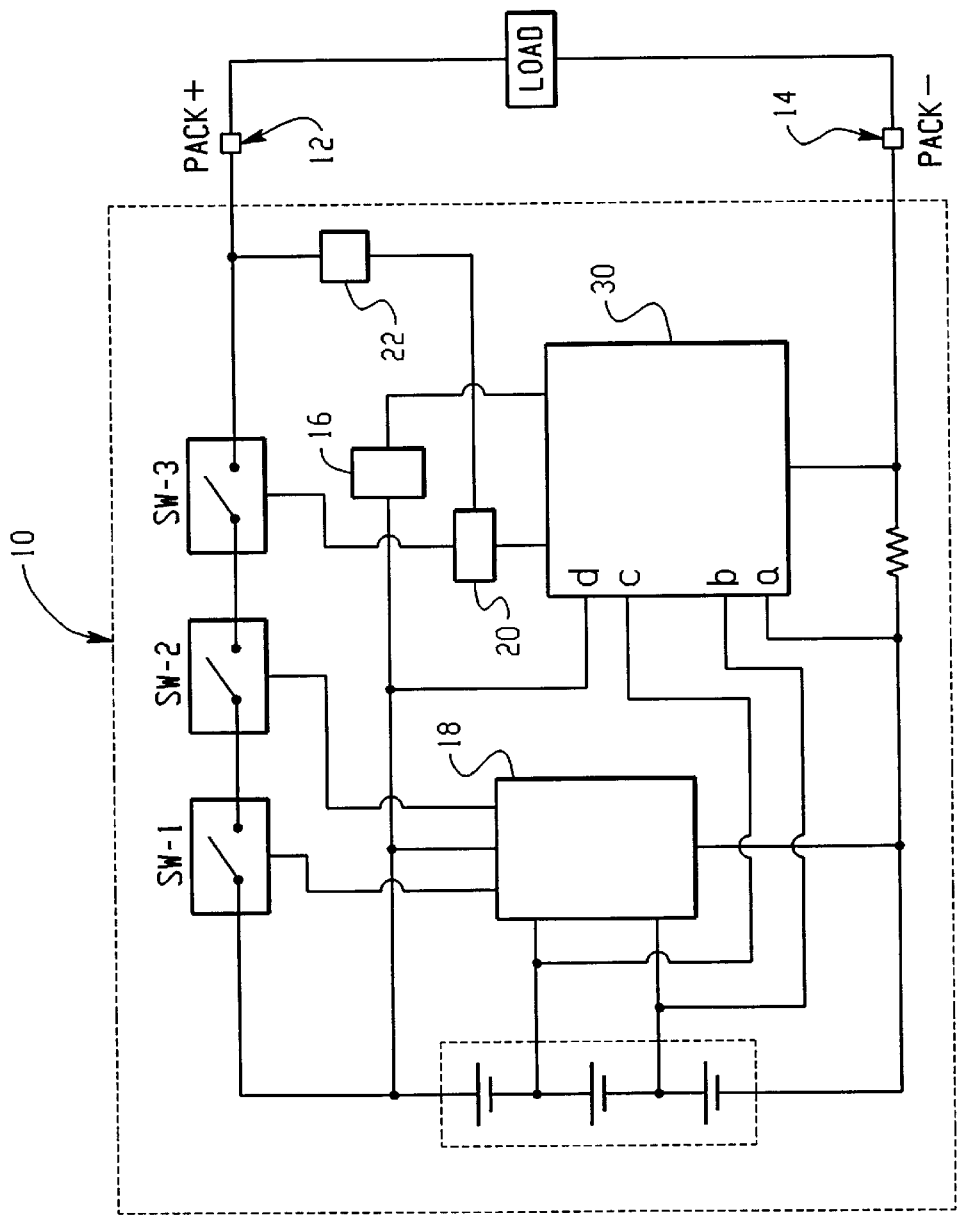
FIG. 3b is a circuit diagram of the discharge control circuitry which modulates the terminal voltage at a certain point(s) to a predetermined value(s), including a boost regulator.

FIG. 3b represents the circuitry in an alternate embodiment of the present invention. This embodiment includes circuitry to increase or maintain the terminal voltage prior to reaching a predetermined threshold(s). This circuitry can be utilized in addition to that described in FIG. 3a or in lieu thereof. The present invention envisions any type of circuitry to accomplish the desired increase in voltage at the terminals of the battery, such as a boost regulator/converter, dc-to-dc converter, switch capacitor, or the like. In this embodiment, the discharge control circuitry 20 increases the terminal voltage by activating a boost converter/regulator 22. When a device measures the terminal voltage after the discharge control circuitry 20 is activated, the voltage represented at the terminals is actually higher than the actual voltage of the battery. In this embodiment, when discharging, if the microcontroller 30 determines that an operation needs to be delayed, such as when there is plenty of capacity remaining in the battery to continue regular operations, the microcontroller 30 activates the discharge control circuitry 20 which activates boost converter/ regulator 22 to maintain the terminal voltage above the threshold voltage which would trigger EODV operations, until such operations need to be initiated.

In an alternate embodiment, if a device has more than one threshold voltage to trigger various operations, the circuitry 20 can maintain the terminal voltage above these thresholds until the appropriate point in time/capacity.

A specific application of this embodiment is when a coke-based lithium-ion battery, is used to mimic a graphite-based lithium ion battery so that the initiation of the device's EODV operations is delayed to avoid wasting capacity. The circuitry is preferably included in the battery's circuitry (i.e., within the battery pack), so that devices need not be modified in order to take advantage of the present invention. The devices can continue to utilize terminal voltage measurements to initiate operations, but the circuitry of the present invention modifies (increases) the terminal voltage of the battery or maintains it above a specific threshold so that operations are delayed until the appropriate point despite battery chemistry.

Following are examples which illustrate procedures for practicing the invention. These examples should not be construed as limiting.

EXAMPLE 1

Triggering EODV Operations Based on Voltage Measurement

Specifically, for a device (e.g., computer) designed for use with coke based lithium-ion cells which is designed to begin EODV save-to-disc operations when the terminal voltage is measured at 8 v, the circuitry of the present invention ensures that there is enough battery capacity to execute all necessary EODV operations even if the cell chemistry changes to, for example, a graphite-based lithium-ion cell (for which at 8 v there would not be enough capacity remaining in the cell to execute the necessary EODV operations). In this situation, the terminal voltage must be modulated (i.e., lowered) prematurely to 8 v. Accordingly, as the remaining battery capacity in the graphite-based lithium-ion cell reaches its limit for EODV operations (which may be in this case 9 v), the discharge control circuit 20 is activated to regulate the voltage at the terminals to 8 v to trigger the device's EODV operations (which are pre-set in the device to trigger only at the set voltage of 8 v), even if the actual voltage is greater than 8 v. This invention can provide a solution in the circuitry of the battery itself to enable the use of the battery containing different cell chemistries (with different discharge profiles) in devices having a set EODV trigger voltage point.

EXAMPLE 2

Triggering EODV Operations Based on Remaining Capacity

For a specific device, at the end of discharge, (8.1 v to 7.5 v discharge range), a coke-based battery has more than 100 mAh capacity remaining so devices designed around such cell chemistries can suspend operations successfully. However, when a graphite based battery voltage reaches 8.5 v, there is not enough capacity to save the data. (Graphite based batteries are not recommended to discharge below 2.7 v/cell whereas coke based batteries can be discharged to 2.5 v/cell). In order for a device initially designed for a coke-based battery which monitors terminal voltage and triggers EODV operations when a specific EODV is reached to be able to utilize graphite based batteries and still suspend successfully, the terminal voltage monitored by the device must be lowered when the graphite-based battery reaches a capacity where EODV operations should be triggered. The analog and digital control circuitry of the present invention is designed to lower this terminal voltage to a predetermined value (such as 7.8 v +/−1% at the terminal) when there is approximately 150 mAh capacity remaining in the graphite based battery. Therefore, the device (e.g., computer) will note the EODV threshold has been met ahead of time and will have sufficient time to save any necessary data and go into suspend mode.

EXAMPLE 3

Delaying EODV Operations Based on Voltage Measurement

Specifically, for a device designed for use with graphite-based lithium-ion cells which is programmed to begin EODV save-to-disc operations when the terminal voltage is measured at 9 v, the circuitry of the present invention delays the triggering so that battery capacity is not wasted even if the cell chemistry changes to, for example, a coke-based lithium-ion cell (for which at 9 v there is more than enough capacity remaining in the cell to execute the necessary EODV operations, and capacity would be wasted). In this situation, the terminal voltage must be modulated and maintained (i.e., raised) above about 9 v to prevent the device from triggering EODV operations. Accordingly, as the remaining battery capacity in the coke-based lithium-ion cell reaches the device's trigger point for EODV operations (which may be in this case 9 v), the discharge control circuit 20 is activated to maintain the voltage at the terminals above 9 v to delay the triggering of the device's EODV operations (which are pre-programmed in the device to trigger only at the set voltage of 9 v), even if the actual voltage is less than 9 v.

It should be understood that the examples and embodiments described herein are for illustrative purposes only and that various modifications or changes in light thereof will be suggested to persons skilled in the art and are to be included within the spirit and purview of this application and the scope of the appended claims.

It is claimed:

1. A method for controlling the triggering of one or more operations in a device which utilizes a battery terminal voltage measurement to trigger said one or more operations at one or more predetermined thresholds, comprising
converting the terminal voltage to one or more predetermined values upon reaching one or more predetermined points.

2. The method of claim 1, wherein said one or more predetermined points are based on a measurement selected from the group consisting of battery voltage, cell voltage, remaining battery capacity, current, time, temperature, pressure, pH, and safety.

3. The method of claim 2, wherein said remaining capacity measurement is approximately a minimum value for remaining capacity required for completing end-of-discharge operations.

4. The method of claim 1, wherein said terminal voltage is converted by discharge control circuitry within the circuitry of the battery.

5. The method of claim 4, wherein said discharge control circuitry activates voltage modulating circuitry to lower the terminal voltage to said one or more predetermined values which substantially match one or more of said predetermined thresholds to trigger said one or more operations.

6. The method of claim 5, wherein said voltage modulating circuitry comprises a switch.

7. The method of claim 5, wherein said voltage modulating circuitry comprises a buck converter.

8. The method of claim 4, wherein said discharge control circuitry activates voltage modulating circuitry to maintain the terminal voltage at said one or more predetermined values above said one or more of said predetermined thresholds to delay triggering of said one or more operations.

9. The method of claim 8, wherein said voltage modulating circuitry comprises a boost converter.

10. The method of claim 1, wherein said one or more predetermined thresholds of said device are programmed based on a coke-based lithium-ion battery chemistry and said terminal voltage is lowered to said one or more predetermined values which substantially match said thresholds to trigger one or more operations when using a graphite-based lithium-ion battery upon reaching said one or more predetermined points.

11. The method of claim 1, wherein said one or more predetermined thresholds of said device are based on a graphite-based lithium-ion battery chemistry and said terminal voltage is maintained at said one or more predetermined values above said thresholds to delay triggering of one or more operations when using a coke-based lithium-ion battery upon reaching said one or more predetermined points.

12. The method of claim 1, wherein said one or more operations include operations selected from the group consisting of end-of-discharge operations, shut down operations, safety operations, save-to-disk operations, peripheral disabling operations, access disabling operations, sleep mode operations, low power mode operations, and alarm operations.

13. An apparatus for controlling the triggering of one or more operations in a device which utilizes a battery terminal voltage measurement to trigger said one or more operations at one or more predetermined thresholds, comprising
means for converting the terminal voltage to one or more predetermined values upon reaching one or more predetermined points.

14. The apparatus of claim 13, wherein said one or more predetermined points are based on a measurement selected from the group consisting of battery voltage, cell voltage, remaining battery capacity, current, time, temperature, pressure, pH, and safety.

15. The apparatus of claim 14, wherein said remaining capacity measurement is approximately a minimum value for remaining capacity required for completing end-of-discharge operations.

16. The apparatus of claim 13, wherein said terminal voltage is converted by discharge control circuitry within the circuitry of the battery.

17. The apparatus of claim 16, wherein said discharge control circuitry activates voltage modulating circuitry to lower the terminal voltage to said one or more predetermined values which substantially match one or more of said predetermined thresholds to trigger said one or more operations.

18. The apparatus of claim 17, wherein said voltage modulating circuitry comprises a switch.

19. The apparatus of claim 17, wherein said voltage modulating circuitry comprises a buck converter.

20. The apparatus of claim 16, wherein said discharge control circuitry activates voltage modulating circuitry to maintain the terminal voltage at one or more predetermined values above one or more of said predetermined thresholds to delay triggering of said one or more operations.

21. The apparatus of claim 20, wherein said voltage modulating circuitry comprises a boost converter.

22. The apparatus of claim 13, wherein said one or more predetermined thresholds of said device are programmed based on a coke-based lithium-ion battery chemistry and said terminal voltage is lowered to said one or more predetermined values which substantially match said thresholds to trigger one or more operations when using a graphite-based lithium-ion battery upon reaching said one or more predetermined points.

23. The apparatus of claim 13, wherein said one or more predetermined thresholds of said device are programmed based on a graphite-based lithium-ion battery chemistry and said terminal voltage is maintained at said one or more predetermined values above said thresholds to delay triggering of one or more operations when using a coke-based lithium-ion battery upon reaching said one or more predetermined points.

24. A control circuit for controlling the triggering of one or more operations in a device which utilizes a battery terminal voltage measurement to trigger said one or more operations at one or more predetermined thresholds, comprising
means for lowering the terminal voltage to one or more predetermined values which substantially matches said one or more of said predetermined thresholds to trigger said one or more operations upon reaching one or more predetermined points, wherein said one or more predetermined points are based on a measurement selected from the group consisting of battery voltage, cell voltage, remaining battery capacity, current, time, temperature, pressure, pH, and safety; and wherein said one or more operations include operations selected from the group consisting of end-of-discharge operations, shut down operations, safety operations, save-to-disk operations, peripheral disabling operations, access disabling operations, sleep mode operations, low power mode operations, and alarm operations.

25. A control circuit for controlling the triggering of one or more operations in a device which utilizes a battery terminal voltage measurement to trigger said one or more operations at one or more predetermined thresholds, comprising means for maintaining the terminal voltage at one or more predetermined values above said one or more of said predetermined thresholds to delay triggering of said one or more operations upon reaching one or more predetermined points, wherein said one or more predetermined points are based on a measurement selected from the group consisting of battery voltage, cell voltage, remaining battery capacity, current, time, temperature, pressure, pH, and safety; and wherein said one or more operations include operations selected from the group consisting of end-of-discharge operations, shut down operations, safety operations, save-to-disk operations, peripheral disabling operations, access disabling operations, sleep mode operations, low power mode operations, and alarm operations.

* * * * *